Patented Aug. 13, 1940

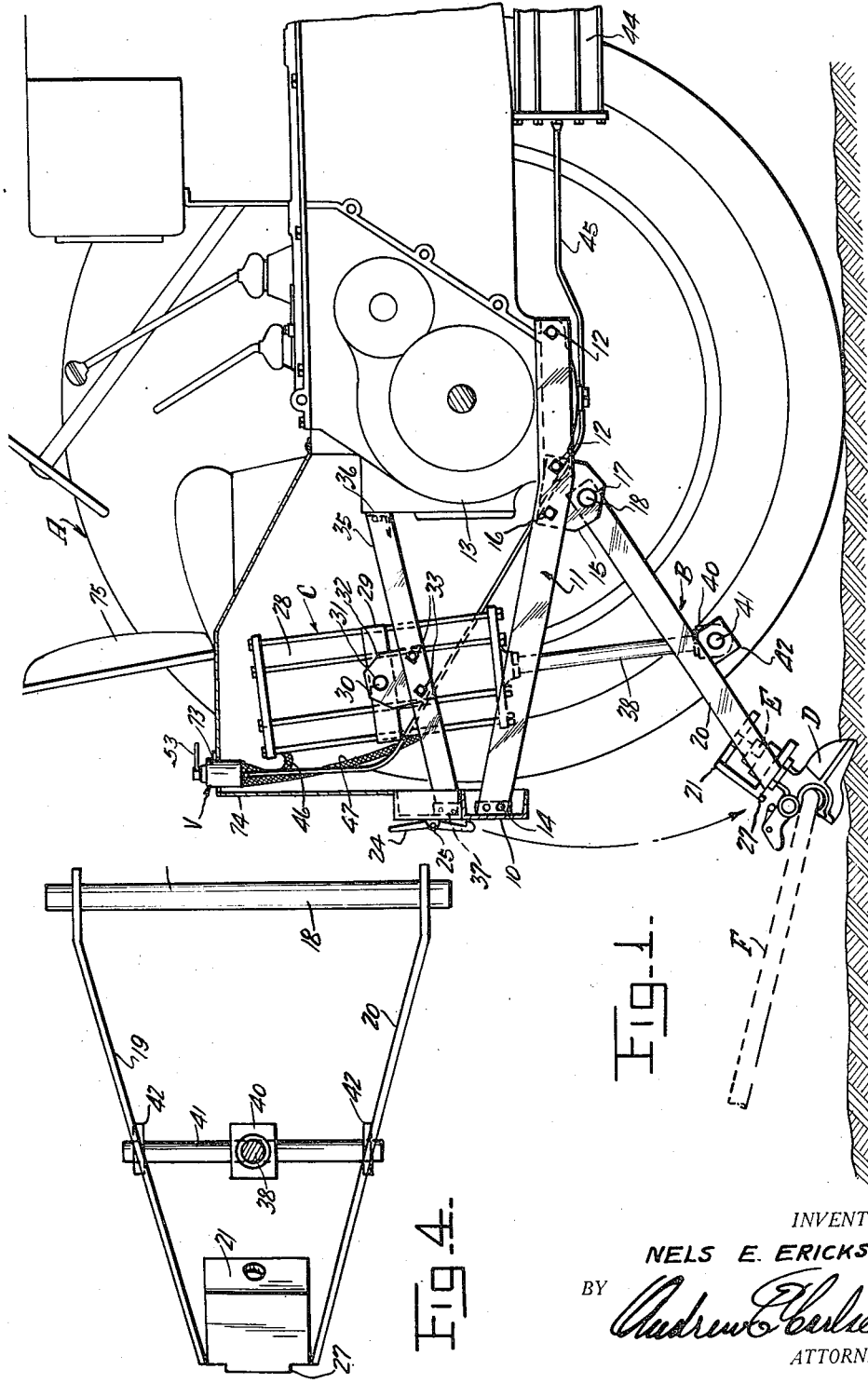

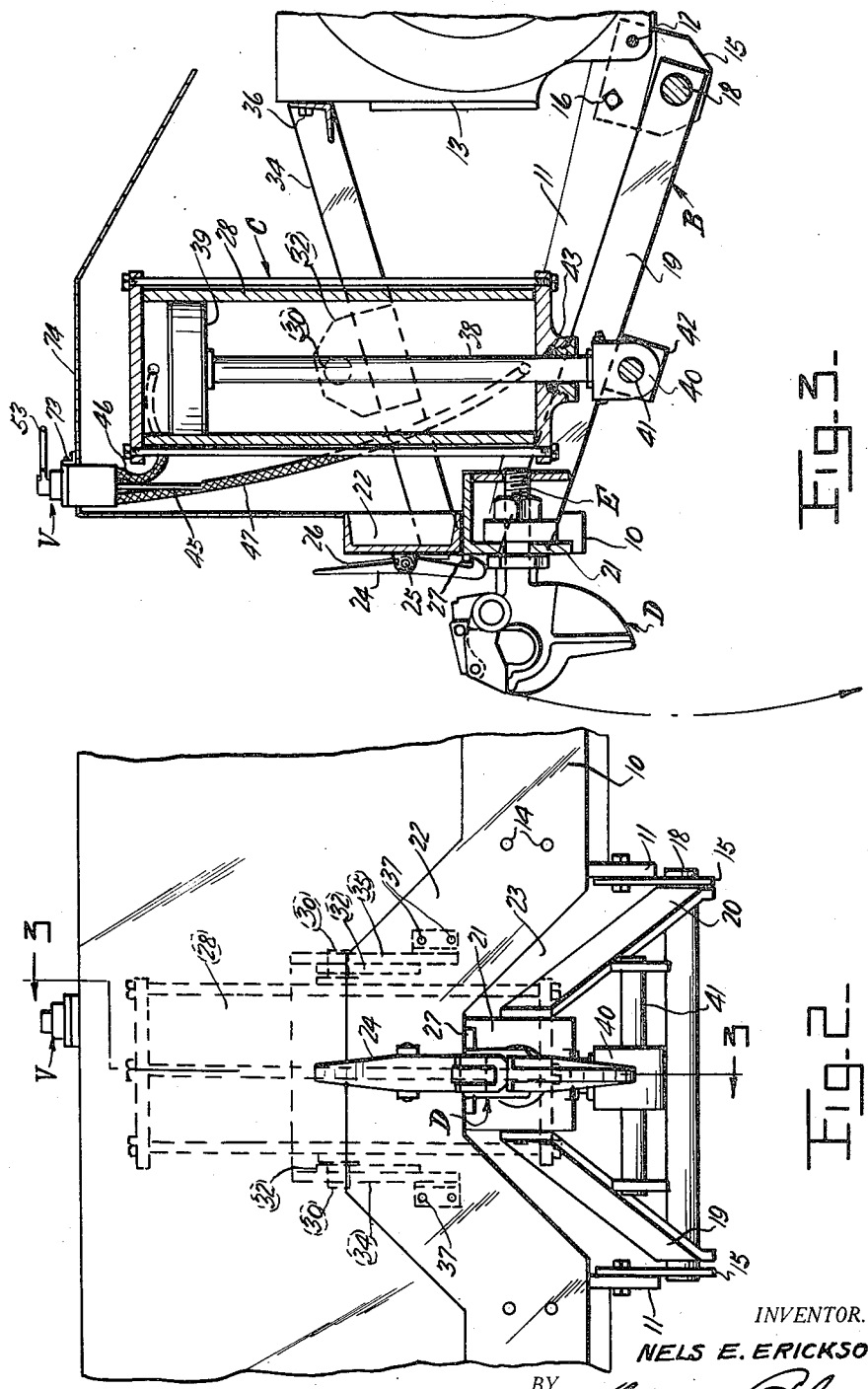

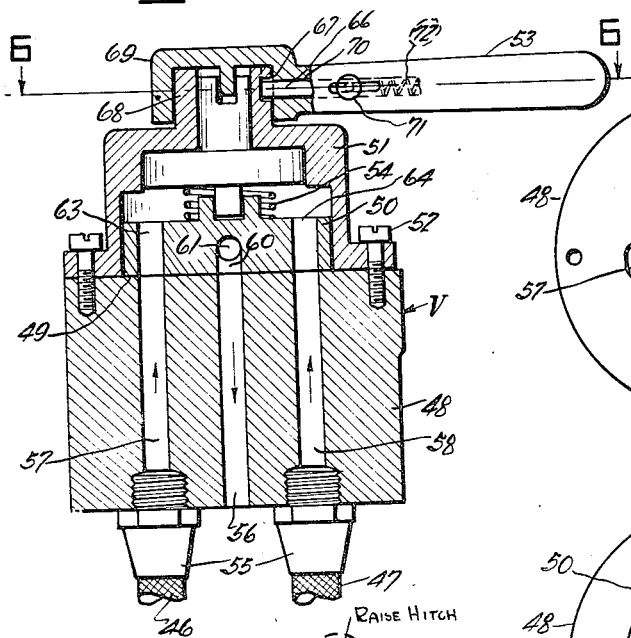
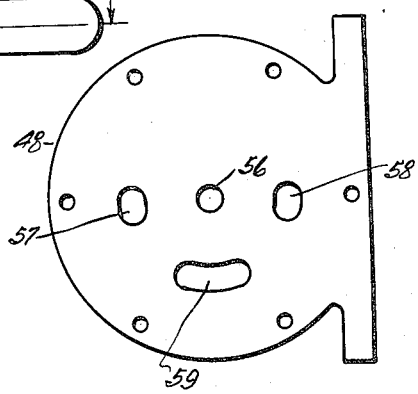
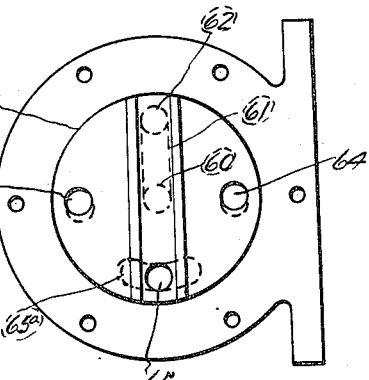
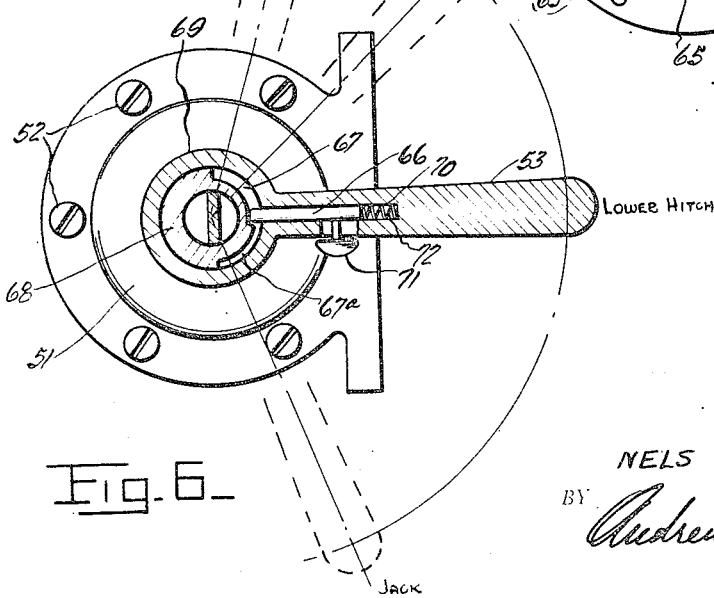

2,210,907

UNITED STATES PATENT OFFICE 2,210,907

POWER LIFT TRACTOR HITCH

Nels E. Erickson, Minneapolis, Minn., assignor to Minneapolis-Moline Power Implement Company, Minneapolis, Minn., a corporation of Delaware Application February 16, 1938, Serial No. 190,743

5 Claims. (Cl. 280—33.44)

This invention relates to improvements in draft hitches for tractors.

In draft hitches as now commonly employed, the hitch extends from the tractors at a fixed vertical elevation and this makes it necessary to elevate the pulling connection of the drawn machine until it falls in line with the hitch and may be connected thereto. In certain types of heavy farm and road machinery, as well as in other fields such as the heavy gun carriages used in artillery practice, this lifting of the draft tongues from their normal positions at, or near, the ground level requires considerable effort as will be readily evident.

With these facts in mind it is the primary object of this invention to provide a hitch which may be lowered to adjust it to the proper level to engage the draft appliance of the machine or implement, and thereafter readily elevated and locked in its normal pulling position. A further object is to provide a tractor hitch lift in which the hitch itself is mounted for movement in a vertical plane as described and is actuated by a pneumatic or hydraulic lift permitting the control of the hitch by a single hand valve and affording the necessary power to raise and lower the hitch under heavy load conditions. A further object is to provide an assembly of this kind wherein the hitch element is pivotally supported from the tractor to extend rearwardly therefrom, and wherein the lift device is mounted above the hitch element and arranged to apply a vertical force thereon to raise and lower the same. This peculiar arrangement of the two main elements of the assembly applies the power in the best possible manner and direction and makes it entirely feasible to use the assembly as a jack for elevating the rear of the tractor off the ground, where such action is required. Still a further object of this invention is to provide an improved control valve particularly suitable for use in connection with the lift unit as herein employed, and which operates to use a minimum quantity of the pneumatic or hydraulic medium, but which provides for the admission of a greater quantity of the operating medium to the unit where the additional power, thus supplied, is needed.

The foregoing and other more specific objects of the invention will be made apparent in the course of the following detailed specification, reference being had to the accompanying drawings wherein:

Figure 1 is a longitudinal, vertical section through the rear portion of a tractor, showing the hitch and lift units applied thereto, and showing the hitch lowered to engage the draft tongue of an implement as same rests near the ground.

Figure 2 is an enlarged rear elevation of the medial portion of the tractor fo Figure 1 and showing the hitch in elevated position.

Figure 3 is a vertical section along the line 3—3 in Figure 2.

Figure 4 is a plan view of the hitch unit alone.

Figure 5 is an enlarged vertical section through the novel and advantageous control valve used in connection with this hitch lift.

Figure 6 is a horizontal section along the line 6—6 in Figure 5.

Figure 7 is a plan view of the valve body showing the various valve parts therein.

Figure 8 is a similar view but showing the valve rotor as seated on the valve body.

Referring now with more particularity, and by reference numerals, to the drawings, A designates a tractor on which the hitch unit B and lift unit C are mounted. It will, of course, be evident that the specific mechanical details of the supporting elements for these units B and C will vary according to the structural peculiarities of the tractor itself and, for this reason, the particular supporting elements as herein shown and described are to be taken as illustrative only.

The tractor A includes a rear transverse beam or bumper bar 10 which is supported above the ground level G by means of the bars 11 which are bolted, as at 12, to the transmission and differential housing 13 of the tractor and extend rearwardly therefrom to the bumper 10 to which they are secured at 14.

These bars 11 serve not only as bumper supports but, in this case, as supports for the hitch unit B. For this purpose hanger plates 15 are secured to the bars 11 at 16 and depend therefrom in transverse alignment to receive within their bearing apertures 17 the transverse pivot pin 18 carried at the rear of the hitch unit. The hitch unit takes the form of a substantially V-shaped form made up of side bars 19 and 20, the divergent frontal ends of which fit between the hanger plates 15 and carry the pin 18 for engagement therewith. The converging rear ends of the bars 19 and 20 are then welded, or otherwise secured, to the draft block 21 and the overall length of the hitch frame is calculated so that in its raised position this block 21 will rest immediately beneath the bumper 10. In order that the hitch may be raised upwardly far enough to clear all obstacles and, in order that it will not project downwardly to any extent below the normal clearance of the tractor, the medial portion of the bumper 10 is arched upwardly, as designated at 22, to provide a downwardly opening recess 23 into which the block 21 will enter in the uppermost position of the hitch.

The hitch block 21 may be provided with any desirable form of hitch or hook, such as that shown here at D, and which is mounted by means of the large stud and nut E. The hitch D is of the type suitable for engagement, in its opened position (Figure 1), with the tongue or draft extension F of an artillery gun carriage (not shown).

It will be apparent from the foregoing that the hitch B may be readily lowered to any desired elevation as it swings on the pin 18. A latch or hook 24 is pivotally mounted at 25 on the rear face of the bumper arch 22 and is actuated by the spring 26 in such manner that it will engage a rib 27 formed on the hitch block 21, when the hitch is raised, and will retain the hitch in its elevated or pulling position. However, by striking the upwardly extended end of the latch 24, the hitch may be readily released when desired.

The lift unit C comprises a cylinder 28 which has a medially located, peripheral band 29 carrying transversely extended and diametrically opposed pivot trunnions 30. These trunnions are pivotally mounted in the apertures 31 of hanger plates 32 which are secured at 33 to support bars 34 and 35. The bars 34 and 35 thus also constitute a part of the supporting assembly, and they are secured at their frontal ends 36 to the housing 13 and at their rear ends 37 to the bumper 10, so that the cylinder 28 may oscillate freely between the bars and above the hitch B.

The cylinder 28 thus has its axis extended in a substantially vertical plane and in which position the piston rod 38, which is secured to a piston 39 slidable within the cylinder will extend downwardly toward the hitch B at a point rearwardly of the pivot pin 18. The lower end of the piston rod 38 then carries a bearing 40 which is pivotally mounted on a transverse rod 41 which is carried across the hitch frame by ears 42 secured to the bars 19 and 20. The piston rod 38 is, of course, suitably packed at 43 where it passes through the lower end of the cylinder.

A tank 44 is mounted in any suitable position on the tractor A and is supplied with air under pressure by a compressor unit (not shown) driven by the tractor engine. A supply line 45 then leads from this tank 44 to a control valve V and the air may be admitted to the cylinder 28, either above or below the piston 39, through the flexible lines 46 and 47, under control of this valve. When air is admitted above the piston 39 the piston and the rod 38 are moved downwardly and thus serve to lower the hitch B to any desired position. On the other hand, when the air is admitted below the piston the hitch B will be raised to the desired position. The trunnions 30 allow the cylinder 28 to oscillate as necessary in the raising and lowering of the hitch.

The foregoing description of the operation of the lift is predicated on the use of air under pressure as the operating medium but it will, of course, be understood that the lift may be operated hydraulically if so desired. However, for several reasons, such as the use of air brakes on the tractor per se, the use of air is probably the most feasible. In an installation of this kind it is of substantial importance to use as little of the air as possible consistent with the work being done and in order that the air supply will not be exhausted too rapidly and for this reason the valve V is of the novel and particularly suitable form now to be described.

The valve comprises the main body or base member 48 having the faced upper surface 49 against which the valve rotor 50 operates. This rotor 50 is retained in place by a cover 51 secured to the base 48 by screws 52 and the rotor is rotated on the face 49 by means of the handle 53 in well known manner. The engagement between the rotor and base is air tight and, for this purpose, the rotor is held seated by the coil spring 54 as well as by air pressure above the rotor and inside the cover 51.

The base 48 has four ports or passages extended from its upper rotor engaging face 49 downwardly through its lower end, where they are arranged to receive conventional couplings 55. One of these ports is located at the center or axis on which the rotor 50 operates and is hereinafter termed the exhaust port 56. The remaining three ports are located in radially spaced positions around this exhaust port, two being diametrically opposed and termed the upper and lower inlet ports 57 and 58, and the other being located between these ports and termed the supply port 59. These ports 57, 58 and 59 are accordingly connected to the lines 46, 47 and 45 respectively. The supply port 59 is widened in an arcuate, circumferential line at its upper extremity, as shown.

The rotor 50 has a centrally located exhaust recess 60 which opens at its lower face and communicates by means of a radial bore 61 with an exhaust recess 62 also opening through the lower face of the rotor. The rotor also has upper and lower inlet ports 63 and 64 and the supply port 65 located intermediate these ports. All of these ports 63, 64 and 65 and the recess 62 are located in a circumferential line at a spacing such that they may, by rotation of the rotor 50, be brought into registry with the ports in the valve base 48. The supply port 65 is also widened at 65a in a circumferential line and the ports 63, 64 and 65 all extend through the rotor to open out through the upper face thereof.

The rotor 50 normally stands in a position at which none of the ports, except, of course, the exhaust port 56 and recess 60 are in registry. In this position the handle 53 stands in the position designated "off" in Figure 6. Now to lower the hitch B, the handle 53 is moved to the position designated at "lower hitch" in Figure 6, and the rotor 50 is thus moved so that the inlet ports 63 and 64 register with the inlet ports 57 and 58 whereupon the compressed air entering through the line 45, the ports 59 and 65 flows over the rotor and into both lines 46 and 47. This action admits air to the cylinder 28 both above and below the piston 39 but, due to the displacement of the piston rod 38, the pressure above the piston is greater than the pressure below and the hitch is lowered. The air pressure below the piston 39 serves as a cushion, however, to prevent the hitch B and the connected machine (if already connected thereto) from falling so rapidly as to possibly cause damage.

To elevate the hitch B the handle 53 is moved to the position designated "raise hitch" and the rotor is then so adjusted that the supply port 65 registers with the lower inlet port 58 and the rotor port 63 registers with the supply port 59.

This action admits air to cylinder 28 below the piston 39 and, at the same time, exhausts the air from above the piston through registry of the exhaust recess 62 with the port 57. The air pressure is thus applied only below the piston and the total force is exerted to raise the hitch and its load.

The foregoing operation covers the normal cycle of operation of the valve, and the handle 53 is limited to the required arc of movement by means of an index pin 66 which engages a partial circumferential groove 67 formed in the neck 68 of the cover 51 over which the cap 69 of the handle fits. However, this pin 66 is slidably mounted in a bore 70 in the handle 53 and carries an extended operating release button 71 by which the pin may be retracted slightly from the groove 67 against the pressure of a coil spring 72 located in said bore 70. This action permits the pin to enter a shallow extension 67a of the groove 67 which enables the operator to move the valve rotor 50 to an "emergency" position designated "jack" in Figure 6. In this position the compressed air enters the cylinder 28 above the piston 39 through registry of the ports 64 and 59 and the ports 65 and 57, while at the same time the lower portion of the cylinder is vented through the registry of the exhaust recess 62 with the lower inlet port 58. This action then applies the full force of the pressure to lowering the hitch B and the draft lock D may actually be forced into the ground beneath the tongue F where necessary. Or, on the other hand, the downward pressure thus applied to the hitch is sufficient to elevate the rear end of the tractor so that the whole assembly may be used as a jack where occasion demands.

It will be evident from the foregoing that the valve thus provided allows the use of a minimum amount of air for ordinary operation of the hitch but still permits the full force to be applied where necessary. The valve is thus held to be an important and vital factor in the operation of this invention.

The valve V may, of course, be located in any convenient position, but it is here shown as mounted by bolts 73 in a housing 74 over the lift unit C, in which position it is convenient to the hand of the operator seated in the tractor seat 75.

It is to be understood that minor changes may be made in the specific structural assembly as hereindisclosed, so long as such changes fall within the spirit and the scope of the appended claims.

Having thus fully described the invention, what I claim as new and desire to secure by Letters Patent is:

1. In combination with a tractor having a transverse bumper bar at its rear, a hitch member pivotally secured to the tractor at a point forwardly from the bumper bar and adapted to swing at its free end upwardly toward the bumper bar, the said bumper bar having a downwardly opening recess for receiving and protecting the free end of the hitch member when the latter is raised.

2. In combination with a tractor having a bumper bar, a hitch frame pivotally supported on the tractor and adapted to swing at its free end upwardly toward the bumper bar, an arch formed in the bumper bar and defining a recess into which the free end of the hitch frame may enter when raised, and means on the said arch for locking the hitch frame in its raised position.

3. In combination with a tractor including a body and a rearwardly disposed bumper, vertically spaced upper and lower members connecting the body and bumper, a hitch device pivotally supported from the lower members for vertical swinging movement with respect thereto, and a power lift assembly pivotally supported from the said upper members above the hitch device and including a pressure operated member connected to the hitch device for vertically adjusting the same.

4. In combination with a tractor including a body and a rearwardly spaced frame member, a pair of upper transversely spaced brace members joining the body and frame member, a pair of lower, transversely spaced brace members secured between body and frame member and spaced below said upper brace member, a hitch frame pivotally supported from the lower brace members on a transverse axis and extended rearwardly therefrom for oscillating movement in a vertical plane beneath said brace members, and a power lift means supported on a transverse axis from the upper brace members and arranged in a generally vertical plane, the said power lift means being connected to the hitch frame rearwardly of its said pivotal connection.

5. In a tractor hitch assembly including a power lift device, the combination of a pair of transversely spaced brace members secured to the tractor in longitudinally extending positions, a hitch frame comprising side members diverging forwardly to points of transversely spaced pivot connection to forward portions of said brace members, hitch means on the converging rear ends of the side members, the said power lift device being supported above the brace members, and a cross member extending between the side members intermediate their ends and connected to the power lift device.

NELS E. ERICKSON.